Feb. 16, 1937.  W. D. CROWELL  2,070,886
VENTILATING APPARATUS FOR VEHICLE BODIES
Original Filed Feb. 13, 1933
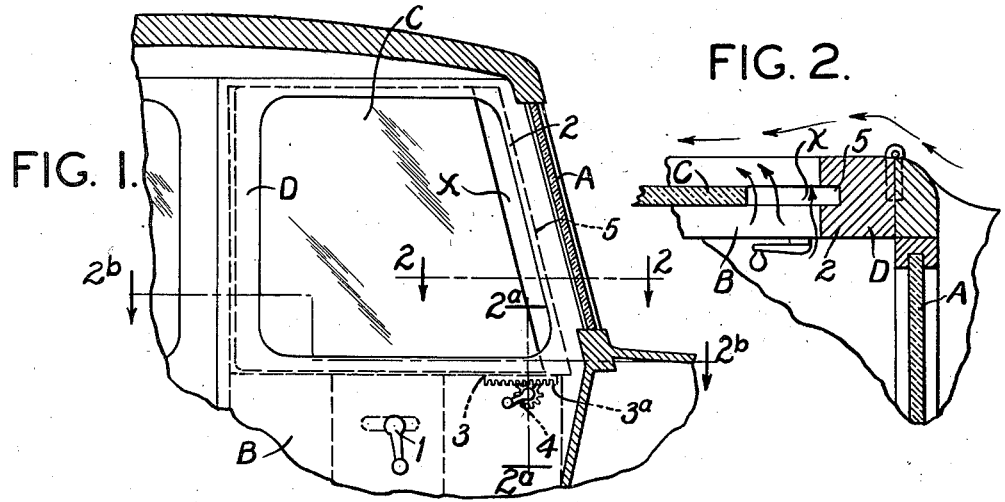
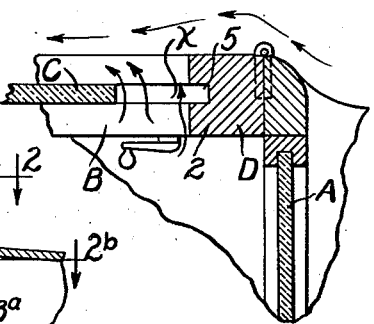
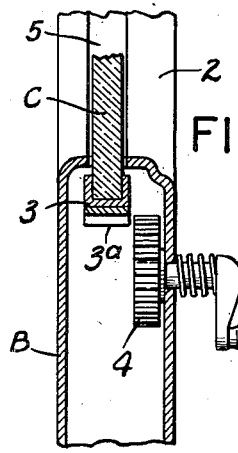
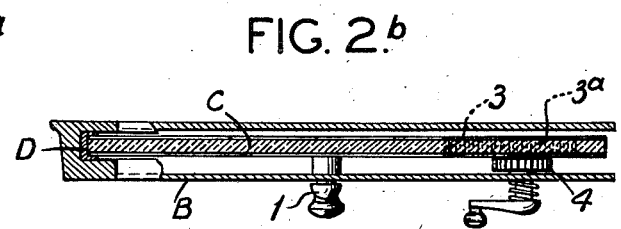
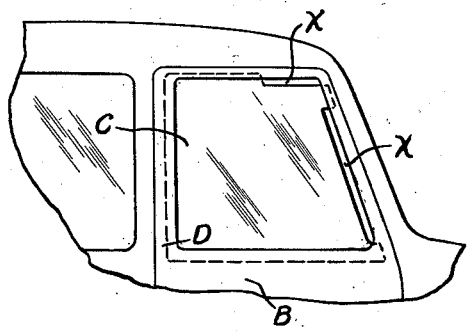
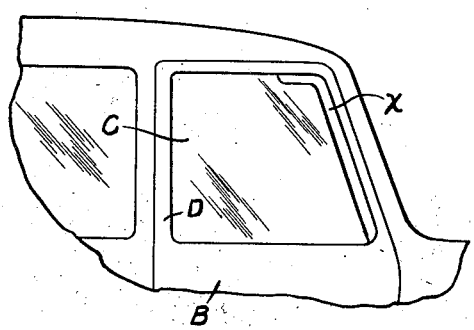
INVENTOR:
WILLIAM D. CROWELL
BY Bakewell & Church
ATTORNEYS Patented Feb. 16, 1937

2,070,886

UNITED STATES PATENT OFFICE 2,070,886

VENTILATING APPARATUS FOR VEHICLE BODIES

William D. Crowell, St. Louis, Mo., assignor to Automobile Ventilation, Inc., Detroit, Mich., a corporation of Michigan Application February 13, 1933, Serial No. 656,475
Renewed September 3, 1935

4 Claims. (Cl. 296—44)

This invention relates to ventilating apparatus for vehicle bodies of the type or kind that comprise a suction opening or ventilating slot in one side wall of the body proportioned and arranged so that when the vehicle is traveling forwardly, the air which rushes rearwardly over said side wall will create a suction or partial vacuum that is exerted on said opening or slot in such a way that air, gases, smoke and the like on the interior of the body will be withdrawn from the body through said opening or slot, without liability of air blowing into the body.

The main object of my invention is to provide a means or apparatus for effectively ventilating a vehicle body, such, for example, as an automobile body, that is inexpensive to construct or install; that does not detract from the lines of the body or mar the appearance of the vehicle, and which is of such design and construction that there is practically no liability of rain beating into the body through the ventilating opening or slot that is relied upon to exhaust air and the like from the interior of the body.

In the accompanying drawing I have illustrated my invention applied to the window of an automobile body side wall door that is located adjacent to the transversely-disposed wind shield at the front end of the body, but I wish it to be understood that my invention is applicable to a so-called rear side wall door and to a window that is mounted in a stationary portion of the side wall of the vehicle.

Figure 1 of the drawing is a fragmentary longitudinal sectional view of an automobile body equipped with a ventilating apparatus constructed in accordance with my invention, showing the inside of one of the front doors of the vehicle.

Figure 2 is a horizontal sectional view, taken on the line 2—2 of Figure 1.

Figure 2a is a vertical sectional view, taken on the line 2a—2a of Figure 1.

Figure 2b is a horizontal sectional view, taken on the line 2b—2b of Figure 1.

Figures 3 and 4 are diagrammatic views for the purpose of making it clear that the ventilating opening may consist of a continuous slot located at or adjacent the front edge and top edge of the window, as shown in Figure 3; or may consist of two separate slots, as shown in Figure 4.

While I have herein illustrated my invention applied to or embodied in a vehicle side wall window whose front upright frame member slopes rearwardly or is slightly inclined, I wish it to be understood that it is immaterial whether said frame member is a vertical member or a slightly inclined or sloping member.

In Figure 1 of the drawing A designates the conventional, transversely disposed wind shield at the front end of a vehicle body, for example, an automobile body, B designates a door in one of the side walls of said body, and C designates an adjustable window mounted in said door so as to form the upper portion of the door, the said window being preferably formed from a single piece of heavy glass surrounded by a frame D that constitutes an integral portion of the door. The door B is a so-called front door that is located in close proximity to the wind shield A, but as previously explained, the invention is applicable to a rear door and to a window that is mounted in a stationary portion of the side wall of the vehicle. The door B is equipped with a conventional window operating mechanism, designated as an entirety by the reference character 1, that can be used to raise and lower the window, and the window glass C is mounted in its frame in such a way that said glass can be moved horizontally, to space the front edge of the glass slightly away from the front upright member of the window frame, and thus produce a ventilating slot $x$ at the front edge of the window through which air, gases, smoke and the like on the interior of the vehicle body are withdrawn by the suction or partial vacuum created on the exterior of the body by the currents of air that rush rearwardly across said ventilating slot, as represented by the arrows in Figure 2, when the vehicle is in forward motion. As shown in Figure 2, the ventilating slot or opening $x$ is so located that there is little or no tendency for rain to beat into the vehicle through said slot when said slot is being used to ventilate the vehicle. Any suitable or preferred means may be used to move the window glass C horizontally towards and away from the upright front member 2 of the window frame, so as to produce the ventilating slot $x$ or produce a tight joint or substantially tight joint between the front edge of the window glass and the frame member 2 when it is not necessary or desirable to ventilate the vehicle body. In the form shown in Figure 1 a part 3 that is attached to the bottom edge of the window glass C is provided with a rack 3a with which a pinion 4 can be engaged when the window is in its raised position, so as to move the window C horizontally towards and away from the front upright member 2 of the window frame, which frame member is provided at its inner edge with a groove 5 in which the front edge portion of the window glass C is housed when the ventilating slot $x$ is not in use. Or, if desired, the mechanism that is used to lower and raise the window could be constructed so as to move the window horizontally, as above described, to produce the ventilating slot $x$ and to close said slot. As shown in Figure 2ª, the pinion 4 is mounted in the door B in such a manner that said pinion can be arranged in one position, wherein it is in engagement with the rack 3ª, and arranged in another position, wherein it is out of engagement with the rack and out of the vertical path of movement of the window. Normally, the pinion 4 lies in a vertical plane, parallel to but at one side of the vertical plane in which the window lies, as shown in broken lines in Figure 2ª. At such times the window C can be raised and lowered by manipulating the window operated mechanism 1, shown in Figure 1. Assuming that the window C is in its closed position with the front edge portion of the window positioned in the groove 5 provided for same in the front upright member 2 of the window frame, the user can shift the pinion 4 laterally into engagement with the rack 3ª attached to the bottom edge portion of the window, as shown in full lines in Figure 2ª, and thereafter can rotate said pinion 4 in a direction to move the window C rearwardly into a position to produce an upright ventilating slot $x$ at the front edge of the window, as shown in Figure 1. As previously stated, the frame D of the window is constructed so that it guides the window during the horizontal movement or adjustment of the window, and the rear upright member of said window frame D is provided with a relatively deep groove in which the rear edge portion of the window is housed, as shown in Figure 2ᵇ, when said window is in a position to produce a ventilating slot at the front edge of same.

As previously explained, I prefer to arrange the ventilating slot or passageway through which air is withdrawn from the vehicle, at or adjacent the front edge of the window C, but this particular location of the ventilating slot is not essential. If desired, the ventilating slot $x$ could extend vertically or substantially so at the front edge of the window and partially along or adjacent to the top edge of the window, as shown diagrammatically in Figure 3; or the ventilating opening or suction opening could be constructed in the form of two slots $x$, one arranged at the front edge of the window and the other at the top edge of the window, as shown diagrammatically in Figure 4. The essential thing so far as my broad idea is concerned is, that the window structure comprise a window which can be moved vertically or substantially vertically; that there be a small ventilating opening or openings adjacent the front edge of the window disposed in the zone of a natural vacuum produced by the forward movement of the vehicle, whereby air and the like will be exhausted from the interior of the body, as previously explained, and that provision be made for moving the window horizontally to close said ventilating opening or openings. Accordingly, in the claims the term "ventilating opening or slot" should be construed as meaning and including either one or a plurality of openings disposed in the manner shown diagrammatically in Figures 3 and 4.

Having thus described my invention, what I claim as new and desire to secure by Letters Patent is:

1. In a vehicle body, the combination of a vertically-adjustable window slidingly mounted in a side wall portion of the body, an operating mechanism for raising and lowering said window, and a separate means for adjusting the window comprising a manually-operated element on said side wall portion normally positioned in a vertical plane at one side of the plane in which said operating mechanism lies, adapted to be bodily shifted into engagement with a co-acting part on the window and thereafter actuated to move the window horizontally into a position to produce a ventilating opening at one of the upright edges of the window.

2. In a vehicle body, the combination of a side wall door, a vertically-adjustable window in said door adapted to be lowered into a pocket in the lower portion of the door, an operating mechanism for raising and lowering the window, a rack attached to the lower portion of the window, and a manually-operable pinion on the door mounted so as to be capable of being shifted laterally into mesh with said rack and thereafter rotated to move the window rearwardly into a position to produce a ventilating opening at the front edge of the window.

3. In a vehicle body having a window opening and a vertically slidable window glass, an operating handle for raising and lowering said glass, said glass being horizontally movable in said opening when fully raised into and out of position to provide a ventilating opening through which air may be exhausted from the vehicle during its travel, mechanism for moving said glass horizontally into and out of ventilating position and including a device carried by the vertically slidable window glass, and an additional handle mounted on the vehicle body for engagement with said device only when the vertically sliding window glass is in a raised position whereby the glass may be moved into and out of ventilating position.

4. In a vehicle body having a window opening and a vertically slidable window glass, an operating handle for raising and lowering said glass, said glass being horizontally movable in said opening when fully raised into and out of position to provide a ventilating opening through which air may be exhausted from the vehicle during its travel, mechanism for moving said glass horizontally into and out of ventilating position and including a device carried by the vertically slidable window glass, and an additional handle mounted on the vehicle body for engagement with said device only when the vertically sliding window glass is in a raised position whereby the glass may be moved into and out of ventilating position, said mechanism being disconnected from the second named handle while the sliding glass is in a lowered position and adapted to be operatively connected with said additional handle only when the sliding glass is in a fully raised position.

WILLIAM D. CROWELL.